(12) United States Patent
Mouri et al.

(10) Patent No.: US 10,738,955 B2
(45) Date of Patent: Aug. 11, 2020

(54) VEHICLE LAMP

(71) Applicant: Toyota Jidosha Kabushiki Kaisha, Toyota-shi, Aichi-ken (JP)

(72) Inventors: Fumihiko Mouri, Owariasahi (JP); Yasushi Yatsuda, Tokyo-to (JP); Yudai Minami, Hadano (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/703,097

(22) Filed: Dec. 4, 2019

(65) Prior Publication Data
US 2020/0182425 A1    Jun. 11, 2020

(30) Foreign Application Priority Data
Dec. 6, 2018 (JP) .................... 2018-229457

(51) Int. Cl.
| F21S 41/16 | (2018.01) |
| B60Q 1/068 | (2006.01) |
| B60Q 1/076 | (2006.01) |
| F21S 41/675 | (2018.01) |
| F21S 41/176 | (2018.01) |

(52) U.S. Cl.
CPC ............. *F21S 41/16* (2018.01); *B60Q 1/068* (2013.01); *B60Q 1/076* (2013.01); *F21S 41/176* (2018.01); *F21S 41/675* (2018.01)

(58) Field of Classification Search
CPC ........ F21S 41/16; F21S 41/176; F21S 41/675; B60Q 1/068; B60Q 1/076
See application file for complete search history.

(56) References Cited

U.S. PATENT DOCUMENTS

| 10,222,474 | B1* | 3/2019 | Raring .................... G01S 17/86 |
| 10,338,377 | B1* | 7/2019 | Milanovi ........... G02B 26/0833 |
| 2015/0062345 | A1* | 3/2015 | Kusanagi ............... G02B 27/01 |
| | | | 348/162 |
| 2017/0067609 | A1 | 3/2017 | Ichikawa et al. |
| 2018/0297470 | A1* | 10/2018 | Kim ........................ B60K 35/00 |
| 2019/0016252 | A1* | 1/2019 | Waragaya ................ B60Q 1/16 |
| 2019/0306475 | A1* | 10/2019 | Inukai ................... H04N 9/3179 |

FOREIGN PATENT DOCUMENTS

JP    2015-164828 A    9/2015

* cited by examiner

*Primary Examiner* — Alan B Cariaso
(74) *Attorney, Agent, or Firm* — Dinsmore & Shohl LLP

(57) ABSTRACT

A vehicle lamp includes: a first laser light source configured to shine a blue first laser beam; second laser light source configured to shine a second laser beam of a color other than blue; a fixed mirror that reflects at least one of the first laser beam or the second laser beam; a moveable mirror that reflects the first laser beam and the second laser beam; a conversion member that is configured to convert the first laser beam into white light as the first laser beam passes through the conversion member; and a controller that is configured so that the movable mirror causes only the first laser beam shone from the first laser light source to pass through the conversion member so as to be shone in the vehicle forward direction toward a high beam area.

7 Claims, 4 Drawing Sheets

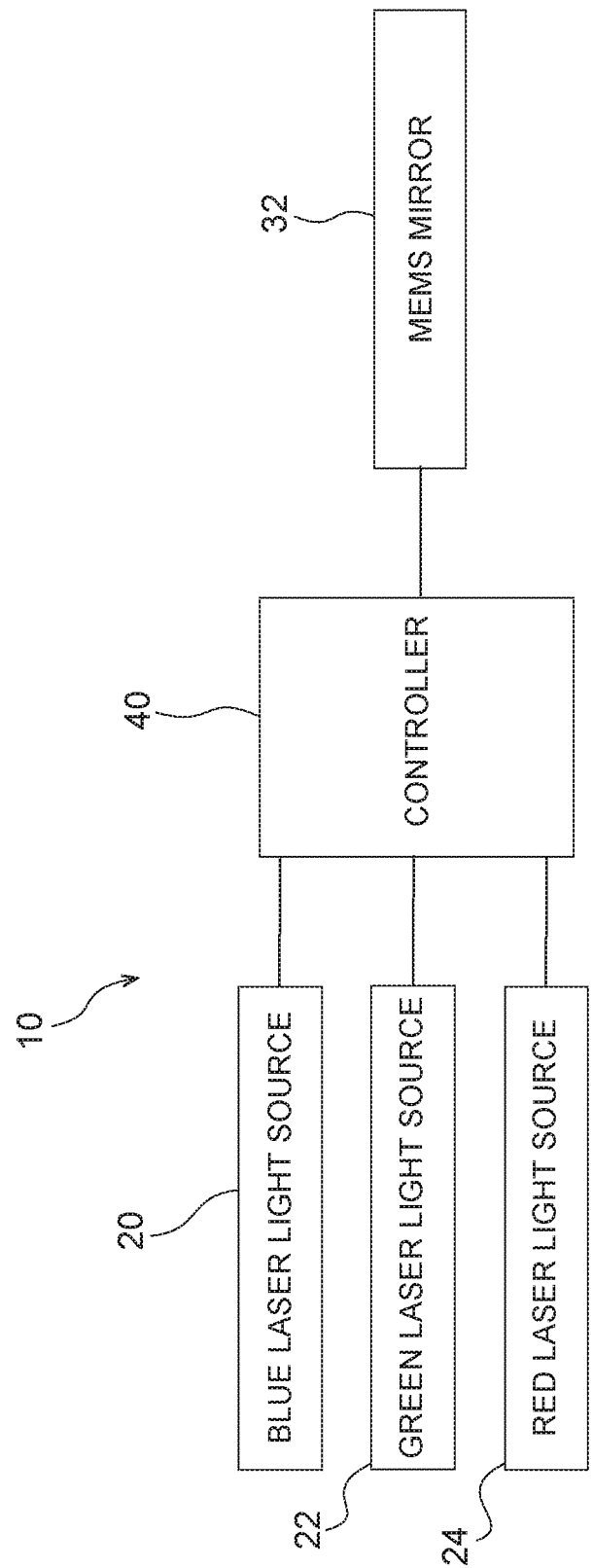

VEHICLE LAMP

CROSS-REFERENCE TO RELATED APPLICATION

This application claims priority under 35 USC 119 from Japanese Patent Application No. 2018-229457, filed on Dec. 6, 2018, the disclosure of which is incorporated by reference herein.

BACKGROUND

Technical Field

The present disclosure relates to a vehicle lamp.

Related Art

Japanese Patent Application Laid-Open (JP-A) No. 2015-164828 discloses a vehicle lamp including a first light source emitting red light, a second light source emitting green light, and a third light source emitting blue light. This vehicle lamp shines a laser beam configured from plural light sources so as to shine a laser beam of a combined color onto a mirror and to draw a prescribed symbol on a road surface.

However, due to there being two units provided, i.e. an optical unit for drawing images on the road surface and an optical unit for shining in the vehicle forward direction, there is still room for improvement from the perspective of making a vehicle lamp more compact.

SUMMARY

The present disclosure provides a vehicle lamp capable of achieving compactness in a configuration capable of drawing images on a road surface and of shining light in front of a vehicle.

A first aspect of the present disclosure is a vehicle lamp including: a first laser light source configured to shine a blue first laser beam; at least one second laser light source configured to shine a second laser beam of a color other than blue; a fixed mirror that reflects at least one of the first laser beam or the second laser beam, so that an optical axis of the first laser beam and an optical axis of the second laser beam are aligned with each other; a moveable mirror that reflects the first laser beam and the second laser beam, while they have aligned optical axes, so as to be reflected in a vehicle forward direction and portray an image on a road surface; a conversion member that is disposed further forward in the vehicle forward direction than the movable mirror and that is configured to convert the first laser beam into white light as the first laser beam passes through the conversion member; and a controller that is configured to cause a combined laser beam, resulting from combining the first laser beam shone from the first laser light source with the second laser beam shone from the second laser light source, to be reflected by the movable mirror so as to be reflected in the vehicle forward direction and portray a symbol on a road surface, and configured so that the movable mirror causes only the first laser beam shone from the first laser light source to pass through the conversion member so as to be shone in the vehicle forward direction toward a high beam area.

In the vehicle lamp of the first aspect includes the first laser light source and the at least one second laser light source. The vehicle lamp is also configured such that the blue first laser beam is shone from the first laser light source and the non-blue second laser beam is shone from the second laser light source. Moreover, at least one out of the first laser beam or the second laser beam is reflected by the fixed mirror, and the laser beam reflected by the fixed mirror is scanned by the movable mirror. Images such as symbols or the like are thereby drawn on the road surface in front of the vehicle. The optical axes of the first laser beam and the second laser beam are aligned with each other by the fixed mirror. The blue first laser beam and the other color second laser beam may thereby be combined so as to enable symbols of various colors to be drawn on the road surface.

The vehicle lamp also includes the conversion member to convert the blue first laser beam into white light, and the controller to control the movable mirror so as to shine the first laser beam so as to pass through the conversion member and be shone toward the high beam area. This accordingly enables the realization of a single optical unit that draws images such as symbols or the like on the road surface and shines toward the high beam area.

In a second aspect of the present disclosure, in the above first aspect, when the first laser beam is shone toward the high beam area, the controller may perform control such that the first laser beam is not shone toward a vehicle traveling ahead of the subject vehicle.

In the vehicle lamp according to the second aspect, the first laser beam is not shone either towards a vehicle-in-front traveling in the same direction and in front of the vehicle, or toward an oncoming vehicle approaching the vehicle from in front of the vehicle. This thereby enable occupants of the vehicle-in-front and occupants of the oncoming vehicle to be suppressed from feeling dazzled.

In a third aspect of the present disclosure, in the above second aspect, the second laser light source may include a green laser light source that shines a green laser beam and a red laser light source that shines a red laser beam.

In the vehicle lamp according to the third aspect, a green laser beam and a red laser beam may also be shone in addition to the blue first laser beam. This thereby enables images such as symbols or the like to be drawn on the road surface with laser beams of even more colors.

In a fourth aspect of the present disclosure, in any one of the first through third aspects, the conversion member is configured by a fluorescent body attached to a glass plate.

In the vehicle lamp according to the fourth aspect, a flat surface is easily formed on the fluorescent body by attaching the fluorescent body to the glass plate. This thereby enables laser beam control to be performed with higher precision than in configurations in which the fluorescent body is disposed as a separate body.

The vehicle lamp of the present disclosure enables compactness to be achieved in a vehicle lamp capable of drawing images on a road surface and of shining light in front of a vehicle.

BRIEF DESCRIPTION OF THE DRAWINGS

Exemplary embodiment of the present disclosure will be described in detail based on the following figures, wherein:

FIG. 4 is a block diagram of a vehicle lamp according to the present exemplary embodiment.

DETAILED DESCRIPTION

Figure 1:
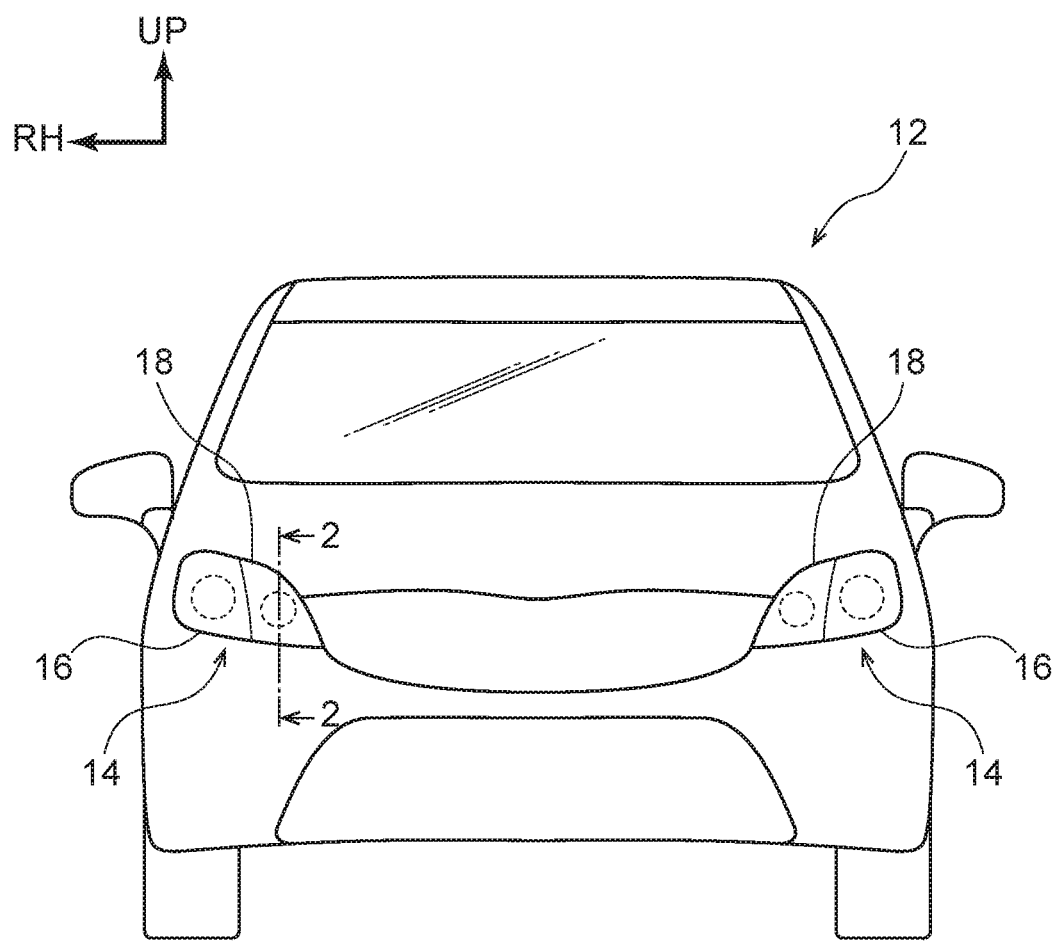
FIG. 1 is a head-on view illustrating a vehicle installed with a vehicle lamp according to an exemplary embodiment.

Explanation follows regarding a vehicle lamp 10 according to an exemplary embodiment, with reference to the drawings. In the drawings arrow FR, arrow UP, and arrow RH respectively illustrate, as appropriate, a forward direction of a vehicle, an upward direction thereof, and a right side in a width direction thereof. In the following explanation when reference is simply made to front-rear, up-down (vertical), or left-right directions then unless explicitly stated otherwise, these represent front-rear in the vehicle front-rear direction, up-down in the vehicle vertical direction, or left-right when facing in the vehicle forward direction.

As illustrated in FIG. 1, a vehicle 12 installed with the vehicle lamp 10 includes a left and right pair of headlamp units 14 employed to secure visibility in front of the vehicle 12, in a configuration in which these headlamp units 14 are left-right symmetrical to each other.

Figure 3:
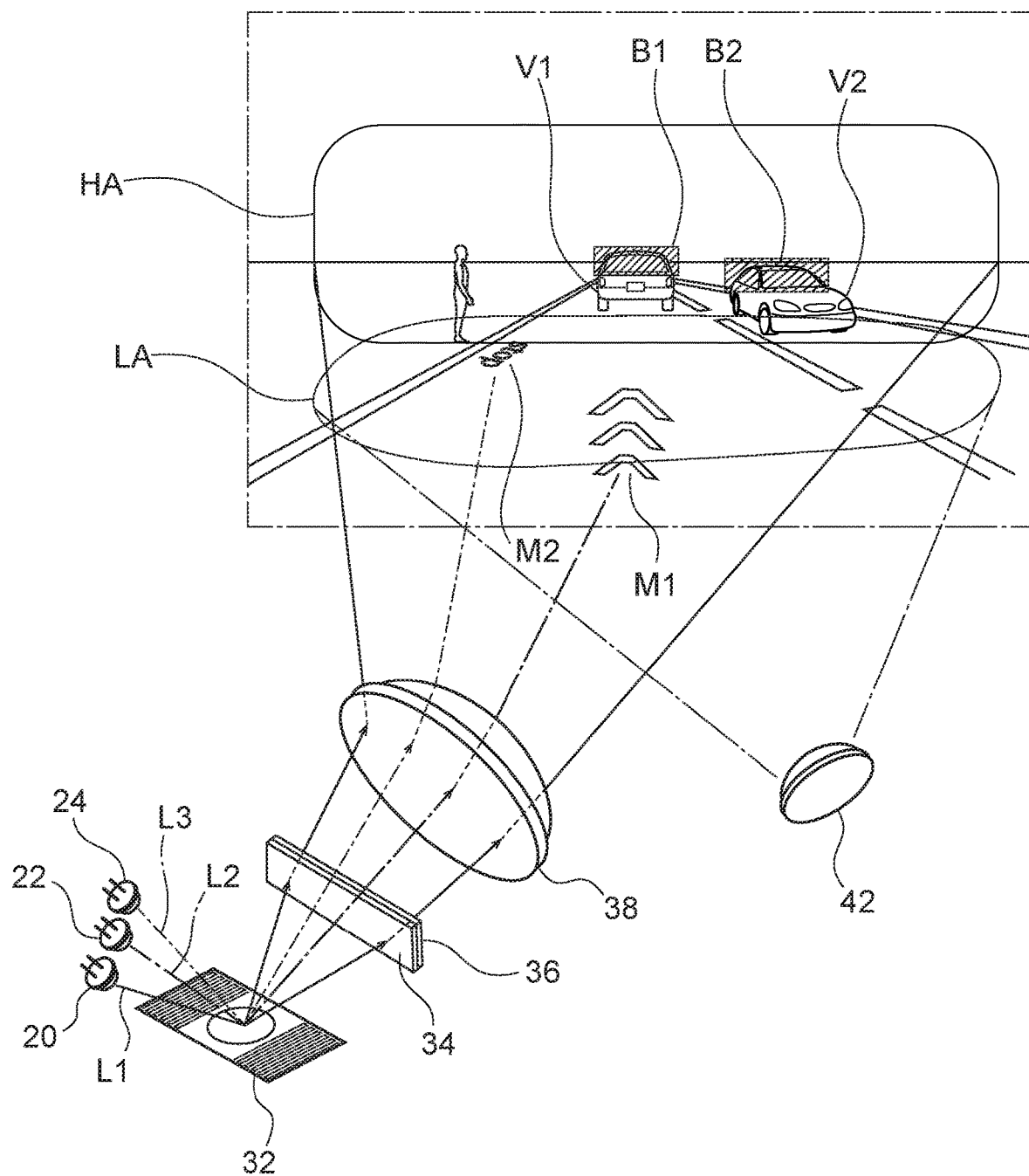
FIG. 3 is a schematic diagram to explain a situation in which images are drawn on a road surface by laser beams shone from respective laser light sources.

Each of the headlamp units 14 is configured including a low beam unit 16 and a high beam unit 18. The low beam unit 16 is positioned at the vehicle width direction outer side and includes a projector 42 as illustrated in FIG. 3. The low beam unit 16 is configured so as to shine visible light for illuminating the road surface from the projector 42 onto a low beam area LA on the road surface in front of the vehicle 12.

As illustrated in FIG. 1, the high beam unit 18 is positioned further to the vehicle width direction inner side than the low beam unit 16 and is configured so as to shine visible light for illuminating in front of the vehicle onto a high beam area HA diagonally above and in front of the low beam area LA shone by the low beam unit 16.

Figure 2:
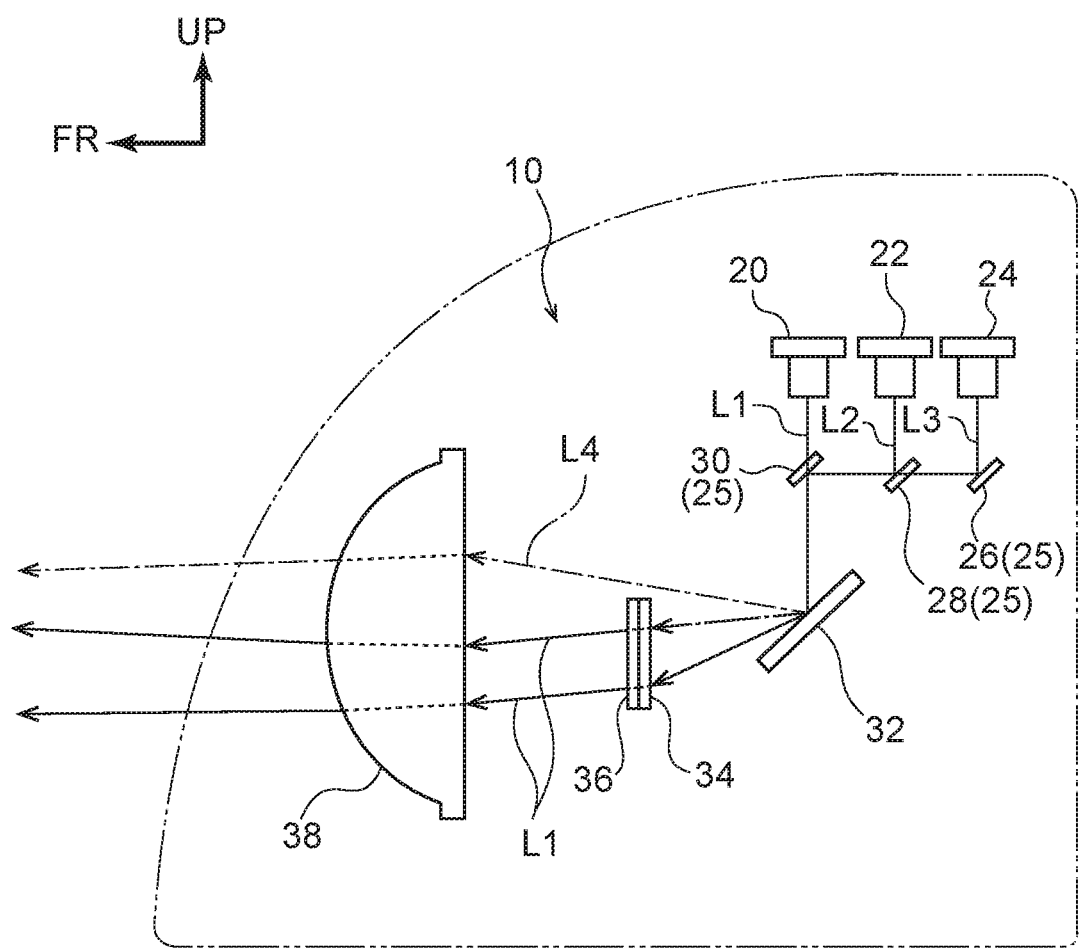
FIG. 2 is a schematic side view cross-section schematically illustrating a section taken along line 2-2 of FIG. 1.

As illustrated in FIG. 2, the high beam unit 18 is configured including a blue laser light source 20 serving as a first laser light source, a green laser light source 22 and a red laser light source 24 serving as a second laser light source, a fixed mirror unit 25, a micro electro mechanical system (MEMS) mirror 32 serving as a movable mirror, a fluorescent body 36 serving as a conversion member, a glass plate 34, and a projection lens 38.

The blue laser light source 20, the green laser light source 22, and the red laser light source 24 are high luminance light sources such as semiconductor lasers (LD: laser diodes) that shine lasers of different colors. The blue laser light source 20 is configured so as to shine a blue laser beam L1.

The green laser light source 22 is disposed at the vehicle rear side of the blue laser light source 20 and is configured so as to shine a green laser beam L2. The red laser light source 24 is disposed at the vehicle rear side of the green laser light source 22 and is configured so as to shine a red laser beam L3 from the red laser light source 24.

The fixed mirror unit 25 is provided at the vehicle lower side of the blue laser light source 20, the green laser light source 22, and the red laser light source 24. The fixed mirror unit 25 is configured including a first fixed mirror 26, a second fixed mirror 28, and a third fixed mirror 30.

The first fixed mirror 26 is disposed at the vehicle lower side of the red laser light source 24, and reflects the red laser beam L3 shone from the red laser light source 24 so as to be reflected in the vehicle forward direction. The second fixed mirror 28 is disposed further forward in the vehicle forward direction than the first fixed mirror 26. The second fixed mirror 28 is positioned at the vehicle lower side of the green laser light source 22 and reflects the green laser beam L2 shone from the green laser light source 22 so as to be reflected in the vehicle forward direction. The optical axes of the red laser beam L3 reflected at the first fixed mirror 26 and of the green laser beam L2 reflected at the second fixed mirror 28 are configured so as to be aligned with each other.

The third fixed mirror 30 is disposed further forward in the vehicle forward direction than the second fixed mirror 28. The third fixed mirror 30 is also positioned at the vehicle lower side of the blue laser light source 20. The third fixed mirror 30 is configured so as to reflect the red laser beam L3 reflected at the first fixed mirror 26 and to reflect the green laser beam L2 reflected at the second fixed mirror 28, so that these laser beams are reflected toward the vehicle lower side.

The first fixed mirror 26, the second fixed mirror 28, and the third fixed mirror 30 are each configured by a dichromatic mirror. The second fixed mirror 28 is accordingly configured so as to reflect the green laser beam L2 and to transmit the red laser beam L3. The third fixed mirror 30 is similarly configured so as to reflect the green laser beam L2 and the red laser beam L3, and to transmit the blue laser beam L1 shone from the vehicle upper side. The present exemplary embodiment accordingly enables at least two laser beams to be combined from out of the blue laser beam L1, the green laser beam L2, and the red laser beam L3. In the following explanation such a combined laser beam will be referred to as a combined laser beam L4.

A MEMS mirror 32 is disposed further to the vehicle lower side than the third fixed mirror 30. A MEMS mirror is a mirror supported by a non-illustrated mirror support section so as to be scannable along two axes. The MEMS mirror 32 is formed on a semiconductor substrate using semiconductor processes.

As illustrated in FIG. 4, the blue laser light source 20, the green laser light source 22, the red laser light source 24, and the MEMS mirror 32 are each electrically connected to a controller 40. Laser beams are shone from each of the laser light sources at freely selected timings based on signals from the controller 40. The MEMS mirror 32 is moved based on signals from the controller 40 so as to scan the laser beams. The controller 40 may, for example, be configured by an electronic control unit (ECU).

The fluorescent body 36 is disposed further forward in the vehicle forward direction than the MEMS mirror 32. The fluorescent body 36 of the present exemplary embodiment is attached to a surface of the glass plate 34 at the vehicle forward direction side thereof. The fluorescent body 36 converts the blue laser beam L1 into white light as the blue laser beam L1 passes through.

The projection lens 38 is provided further forward in the vehicle forward direction than the fluorescent body 36. The projection lens 38 is formed with a profile that when viewed from the side of the vehicle is convex on the vehicle forward direction side. The projection lens 38 is configured such that the blue laser beam L1, the green laser beam L2, and the red laser beam L3 pass through the projection lens 38 so as to be shone in the vehicle forward direction.

FIG. 3 illustrates an example of a symbol (mark) drawn on the road surface. For ease of explanation, the blue laser light source 20, the green laser light source 22, and the red laser light source 24 are illustrated in FIG. 3 with placements shifted from where they are actually disposed. Moreover, although the fixed mirror unit 25 is omitted from illustration, in reality the laser beams shone from the respective laser light sources are combined at the fixed mirror unit 25 so as to configure the combined laser beam that is then reflected at the MEMS mirror 32.

As illustrated in FIG. 3, the green laser beam L2 shone from the green laser light source 22 toward the MEMS mirror 32 passes through the projection lens 38 and is shone in the vehicle forward direction toward the low beam area LA. A mark M1 configured by substantially V-shapes is drawn in green on the road surface by the green laser beam L2 being scanned by the MEMS mirror 32. When this is being performed, the controller 40 controls the MEMS mirror 32 such that the green laser beam L2 is shone directly toward the projection lens 38 without passing through the fluorescent body 36. The mark M1 is a mark for indicating the traveling direction of the vehicle around.

The red laser beam L3 shone from the red laser light source 24 toward the MEMS mirror 32 passes through the projection lens 38 and is shone in the vehicle forward direction toward the low beam area LA. A mark M2 is drawn in red on a road shoulder by the red laser beam L3 being scanned by the MEMS mirror 32. When this is being performed, the controller 40 controls the MEMS mirror 32 such that the red laser beam L3 is shone directly toward the projection lens 38 without passing through the fluorescent body 36. The mark M2 is shaped in the form of the letters STOP, so as to enable a pedestrian to be prompted to pay attention.

In the present exemplary embodiment the controller 40 controls such that when the mark M1 is being drawn, light is not emitted from the blue laser light source 20 or the red laser light source 24 and light is only emitted from the green laser light source 22. In a similar manner, the controller 40 controls such that when the mark M2 is being drawn, light is not emitted from the blue laser light source 20 or the green laser light source 22 and light is only caused to be emitted from the red laser light source 24.

However there is no limitation thereto, and both the green laser beam L2 and the red laser beam L3 may be shone while the mark M1 is being drawn so as to draw the mark M1 onto the road surface with a yellow combined laser beam LA.

The blue laser beam L1 shone from the blue laser light source 20 toward the MEMS mirror 32 passes through the fluorescent body 36 and is converted into white light. The white light is then shone from the projection lens 38 in the vehicle forward direction toward the high beam area HA. In other words, the controller 40 causes the blue laser beam L1 shone from the blue laser light source 20 to be reflected by the MEMS mirror 32 so as to pass through the fluorescent body 36 before being shone toward the high beam area HA.

The vehicle lamp 10 of the present exemplary embodiment is controlled as a so-called variable luminosity distribution headlamp, such that white light (emanating from the blue laser beam L1) is not shone toward either a vehicle-in-front V1 or an oncoming vehicle V2 traveling in front of the vehicle when the white light is being shone toward the high beam area HA. More specifically, the controller 40 detects the vehicle-in-front V1 and the oncoming vehicle V2 traveling in front of the vehicle using sensors such as a non-illustrated optical camera or radar. Then when the white light is being scanned and shone by the MEMS mirror 32, the controller 40 stops the light from being emitted by the blue laser light source 20 only at the regions where the vehicle-in-front V1 and the oncoming vehicle V2 are present. This accordingly forms a blind region B1 and a blind region B2 at portions of the high beam area HA where white light is not being shone.

Operation and Effects

Explanation follows regarding the operation and effects of the present exemplary embodiment.

In the vehicle lamp 10 of the present exemplary embodiment, as illustrated in FIG. 2, the combined laser beam L4 may be produced due to the optical axes of the laser beams shone from the blue laser light source 20, the green laser light source 22, and the red laser light source 24 being configured so as to be aligned with each other by the fixed mirror unit 25. Thus by reflecting the combined laser beam L4 using the MEMS mirror 32, marks of various colors may be drawn on the road surface in the low beam area LA.

Moreover, in the present exemplary embodiment, the blue laser beam L1 is shone from the blue laser light source 20 toward the fluorescent body 36 and converted into white light so as to enable white light after conversion to be shone from the projection lens 38 in the vehicle forward direction toward the high beam area HA. This enables realization of a single optical unit that both draws images on the road surface and shines light toward the high beam area HA.

Furthermore, due to the present exemplary embodiment being employed in a variable luminosity distribution headlamp, the laser beam is not shone onto the vehicle-in-front V1 and the oncoming vehicle V2 as illustrated in FIG. 3. This enables occupants of the vehicle-in-front V1 and occupants of the oncoming vehicle V2 to be suppressed from feeling dazzled.

Moreover, due to the present exemplary embodiment being equipped with both the green laser light source 22 and the red laser light source 24 in addition to the blue laser light source 20, combining the laser beams of three colors enables images to be drawn in more colors than in a structure only equipped with two laser light sources.

Moreover, in the present exemplary embodiment the fluorescent body 36 which serves as a conversion member is attached to the vehicle forward direction side face of the glass plate 34. This accordingly facilitates forming the incident face of the fluorescent body 36, on which the blue laser beam L1 reflected from the MEMS mirror 32 is incident, as a flat surface. As a result this enables laser beam control (scanning) to be performed with higher precision than in configurations in which the fluorescent body 36 is disposed as a separate body. The present exemplary embodiment is accordingly able to achieve a compact vehicle lamp 10 in a configuration capable of drawing images on a road surface and shining light in front of a vehicle.

Although an exemplary embodiment has been described above, obviously various embodiments may be implemented within a range not departing from the spirit of the present disclosure. For example, the mark M1 and the mark M2, which are drawn by the blue laser beam L1, the green laser beam L2, and the red laser beam L3, may be different marks than those of the illustrated examples.

Moreover, a configuration may be adopted having four or more laser light sources disposed therein and capable of shining laser beams of four or more colors.

Furthermore, although the MEMS mirror 32 scannable along two axes is employed as the moveable mirror of the present exemplary embodiment, there is no limitation thereto, and another mirror may be employed therefor. For example, a mirror capable of scanning along two axes may be employed that is configured by a combination of uniaxial actuators.

Furthermore, although in the present exemplary embodiment a fluorescent body 36 is employed as a conversion member, there is no limitation thereto, and any other conversion member capable of converting the blue laser beam L1 into white light may be employed therefor.

What is claimed is:

1. A vehicle lamp, comprising:
a first laser light source configured to shine a blue first laser beam;
at least one second laser light source configured to shine a second laser beam of a color other than blue;
a fixed mirror that reflects at least one of the first laser beam or the second laser beam, so that an optical axis of the first laser beam and an optical axis of the second laser beam are aligned with each other;
a moveable mirror that reflects the first laser beam and the second laser beam, while they have aligned optical axes, so as to be reflected in a vehicle forward direction and portray an image on a road surface;
a conversion member that is disposed further forward in the vehicle forward direction than the movable mirror and that is configured to convert the first laser beam into white light as the first laser beam passes through the conversion member; and
a controller that is configured to cause a combined laser beam, resulting from combining the first laser beam shone from the first laser light source with the second laser beam shone from the second laser light source, to be reflected by the movable mirror so as to be reflected in the vehicle forward direction and portray a symbol on a road surface, and configured so that the movable mirror causes only the first laser beam shone from the first laser light source to pass through the conversion member so as to be shone in the vehicle forward direction toward a high beam area.

2. The vehicle lamp of claim 1, wherein, when the first laser beam is shone toward the high beam area, the controller performs control such that the first laser beam is not shone toward a vehicle traveling ahead of the subject vehicle.

3. The vehicle lamp of claim 2, wherein the second laser light source includes a green laser light source that shines a green laser beam and a red laser light source that shines a red laser beam.

4. The vehicle lamp of any one of claim 1, wherein the conversion member is configured by a fluorescent body attached to a glass plate.

5. The vehicle lamp of any one of claim 1, wherein the movable mirror is configured by an MEMS mirror.

6. The vehicle lamp of claim 1, wherein a symbol to indicate a direction of travel of the subject vehicle is portrayed on the road surface by causing the combined laser beam to be reflected in the vehicle forward direction.

7. The vehicle lamp of claim 1, wherein a symbol to prompt a pedestrian to pay attention is portrayed on the road surface by causing the combined laser beam to be reflected in the vehicle forward direction.

* * * * *

UNITED STATES PATENT AND TRADEMARK OFFICE
CERTIFICATE OF CORRECTION

PATENT NO. : 10,738,955 B2
APPLICATION NO. : 16/703097
DATED : August 11, 2020
INVENTOR(S) : Fumihiko Mouri, Yasushi Yatsuda and Yudai Minami It is certified that error appears in the above-identified patent and that said Letters Patent is hereby corrected as shown below:

On the Title Page

Item (72), inventor 1, city, delete "Owariasahi" and insert --Owariasahi-shi, Aichi-ken--, therefor.

Item (72), inventor 2, city, delete "Tokyo-to" and insert --Meguro-ku, Tokyo-to--, therefor.

Item (72), inventor 3, city, delete "Hadano" and insert --Hadano-shi, Kanagawa-ken--, therefor.

In the Specification

In Column 5, Line(s) 36, after "beam", delete "LA" and insert --L4--, therefor.

Signed and Sealed this
Twenty-second Day of December, 2020

Andrei Iancu
*Director of the United States Patent and Trademark Office*